United States Patent
Chatterjee et al.

(10) Patent No.: US 9,230,208 B2
(45) Date of Patent: Jan. 5, 2016

(54) HAPTIC-BASED ARTIFICIAL NEURAL NETWORK TRAINING

(71) Applicant: International Business Machines Corporation, Armonk, NY (US)

(72) Inventors: Aveek N. Chatterjee, Bangalore (IN); Siddique M. Adoni, Bangalore (IN); Dhandapani Shanmugam, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 71 days.

(21) Appl. No.: 14/132,113

(22) Filed: Dec. 18, 2013

(65) Prior Publication Data

US 2015/0170023 A1 Jun. 18, 2015

(51) Int. Cl.

| G06F 15/18 | (2006.01) |
|---|---|
| G06E 1/00 | (2006.01) |
| G06E 3/00 | (2006.01) |
| G06G 7/00 | (2006.01) |
| G06N 3/08 | (2006.01) |
| G06F 3/01 | (2006.01) |

(52) U.S. Cl.
CPC . *G06N 3/08* (2013.01); *G06F 3/016* (2013.01)

(58) Field of Classification Search
None
See application file for complete search history.

(56) References Cited

U.S. PATENT DOCUMENTS

| 6,889,165 | B2 | 5/2005 | Lind et al. | |
|---|---|---|---|---|
| 6,976,012 | B1 | 12/2005 | Rising, III | |
| 8,181,540 | B2 | 5/2012 | Loeb et al. | |
| 8,286,074 | B2 * | 10/2012 | Shanmugam | G06F 17/2247 707/736 |
| 8,351,981 | B2 * | 1/2013 | Matada | H04W 72/048 370/338 |
| 8,375,382 | B2 * | 2/2013 | Broussard | G06F 8/68 717/168 |
| 8,392,906 | B2 * | 3/2013 | Broussard | G06F 8/68 717/168 |
| 8,874,171 | B2 * | 10/2014 | Matada | H04W 72/048 370/342 |
| 8,972,279 | B2 * | 3/2015 | Cole | G06Q 30/0255 705/14.49 |

(Continued)

FOREIGN PATENT DOCUMENTS

| CN | 104732275 A | 6/2015 |
|---|---|---|
| EP | 736826 B2 | 7/2005 |

(Continued)

OTHER PUBLICATIONS

A Cellular Neural Network Methodology for Deformable Object Simulation Yongmin Zhong ; Shirinzadeh, B. ; Alici, G. ; Smith, J. Information Technology in Biomedicine, IEEE Transactions on vol. 10 , Issue: 4 DOI: 10.1109/TITB.2006.875679 Publication Year: 2006 , pp. 749-762.*

(Continued)

*Primary Examiner* — Michael B Holmes
(74) *Attorney, Agent, or Firm* — Edward J. Wixted, III

(57) ABSTRACT

In a method for training an artificial neural network based algorithm designed to monitor a first device, a processor receives a first data. A processor determines a first service action recommendation for a first device using the received first data and an artificial neural network (ANN) algorithm. A processor causes a second device to provide haptic feedback using the received first data. A processor receives a second service action recommendation for the first device based on the haptic feedback. A processor adjusts at least one parameter of the ANN algorithm such that the ANN algorithm determines a third service action recommendation for the first device using the received first data, wherein the third service action recommendation is equivalent to the second service action recommendation.

12 Claims, 4 Drawing Sheets

(56) References Cited

U.S. PATENT DOCUMENTS

| | | | |
|---|---|---|---|
| 9,013,426 B2* | 4/2015 | Cole | G06F 3/016 345/173 |
| 9,043,230 B2* | 5/2015 | Adoni | G06Q 30/0631 705/26.8 |
| 9,046,926 B2* | 6/2015 | Mohammed | G06F 3/016 1/1 |
| 9,053,508 B2* | 6/2015 | Adoni | G06Q 30/0631 1/1 |
| 9,058,056 B2* | 6/2015 | Mohammed | G06F 3/016 1/1 |
| 2005/0034023 A1 | 2/2005 | Maturana et al. | |
| 2008/0288115 A1 | 11/2008 | Rusnak et al. | |
| 2010/0057548 A1* | 3/2010 | Edwards | 705/14.13 |
| 2010/0306001 A1 | 12/2010 | Discenzo et al. | |
| 2012/0056846 A1 | 3/2012 | Zaliva | |
| 2012/0242482 A1 | 9/2012 | Elumalai et al. | |
| 2012/0278127 A1* | 11/2012 | Kirakosyan et al. | 705/7.29 |
| 2014/0201025 A1* | 7/2014 | Adoni et al. | 705/26.7 |
| 2014/0201026 A1* | 7/2014 | Adoni et al. | 705/26.7 |
| 2015/0087257 A1* | 3/2015 | Balram et al. | 455/404.1 |
| 2015/0088546 A1* | 3/2015 | Balram et al. | 705/3 |
| 2015/0088547 A1* | 3/2015 | Balram et al. | 705/3 |
| 2015/0106912 A1* | 4/2015 | Brandon et al. | 726/13 |
| 2015/0170024 A1 | 6/2015 | Chatterjee et al. | |

FOREIGN PATENT DOCUMENTS

| | | |
|---|---|---|
| EP | 1564411 B1 | 3/2008 |
| EP | 2450861 A1 | 5/2012 |
| EP | 1839151 B1 | 7/2012 |
| EP | 2527977 A2 | 11/2012 |

OTHER PUBLICATIONS

A biomimetic soft fingertip applicable to haptic feedback systems for texture identification Chathuranga, D.S.; Zhongkui Wang; Van Anh Ho; Mitani, A.; Hirai, S. Haptic Audio Visual Environments and Games (HAVE), 2013 IEEE International Symposium on DOI: 10.1109/HAVE.2013.6679606 Publication Year: 2013, pp. 29-33.*

Transfer of skills between human operators through haptic training with robot coordination Chung Hyuk Park; Jae Wook Yoo; Howard, A.M. Robotics and Automation (ICRA), 2010 IEEE International Conference on DOI: 10.1109/ROBOT.2010.5509160 Publication Year: 2010, pp. 229-235.*

A higher order polynomial reproducing radial basis function neural network (HOPR-RBFN) for real-time interactive simulations of nonlinear deformable bodies with haptic feedback Deo, D.; De, S. Haptics Symposium, 2010 IEEE DOI: 10.1109/HAPTIC.2010.5444607 Publication Year: 2010, pp. 527-530.*

Haptic-enabled teleoperation of base-excited hydraulic manipulators applied to live-line maintenance Banthia, V.; Maddahi, Y.; Balakrishnan, S.; Sepehri, N. Intelligent Robots and Systems (IROS 2014), 2014 IEEE/RSJ International Conference on Year: 2014 pp. 1222-1229, DOI: 10.1109/IROS.2014.6942713 Referenced in: IEEE Conference Publications.*

A Mechanism for Web Service Selection and Recommendation Based on Multi-QoS Constraints Shao-chong Li; Hao-peng Chen; Xi Chen Services (Services-1), 2010 6th World Congress on Year: 2010 pp. 221-228, DOI: 10.1109/Services.2010.31 Referenced in: IEEE Conference Publications.*

Allweiler, "Allmind—More Safety for less costs", Product website, retrieved on Aug. 21, 2013 from website: <http://www.allweiler.com/57035/Product/SMART-Solutions/ALLMIND>.

Discenzo et al., "Next Generation Pump Systems Enable New Opportunities for Asset Management and Economic Optimization", Flowserve Corporation: Pump Division, Irving, Texas, website: <www.flowserve.com>.

Mobasser et al., "A Model-Independent Force Observer for Teleoperation Systems", Proceedings of the IEEE International Conference on Mechatronics & Automation, Niagara Falls, Canada, Jul. 2005.

Ransiri et al., "WatchMe: Wrist-worn Interface that Makes Remote Monitoring Seamless", Copyright ASSETS '12, Oct. 22-24, 2012, Boulder, Colorado, USA, ACM 978-1-4503-1321-6/12/2010

Sgambelluri et al., "An Artificial Neural Network approach for Haptic Discrimination in Minimally Invasive Surgery", 16th IEEE International Conference on Robot & Human Interactive Communication, Aug. 26-29, 2007, Jeju, Korea.

Smith, Andrew et al., "Neural-Network-Based Contact Force Observers for Haptic Applications", IEEE Transactions on Robotics, vol. 22, No. 6, Dec. 2006.

Smith, Tom, "Loudon Water Implements Vibration Monitoring", Pumps & Systems Magazine, retrieved on Aug. 21, 2013 from website: <http://www.pump-zone.com/topics/instrumentationcontrols/loudon-water>.

Tappeiner et al., "Remote Haptic Feedback from a Dynamic Running Machine", 2009 IEEE International Conference on Robotics and Automation, Kobe, Japan, May 12-17, 2009.

Wikipedia, "Active learning (machine learning)", Wikipedia, the free encyclopedia, retrieved on Oct. 1, 2013 from website: <http://en.wikipedia.org/w/index.php?title=Active_learning_(machinelearning)>.

U.S. Appl. No. 14/309,001 filed Jun. 19, 2014 entitled: Haptic-Based Artificial Neural Network Training.

Liu et al., "Rate Regulation with Feedback Controller in ATM Networks—A Neural Network Approach", IEEE Journal on Selected Areas in Communications, vol. 15, No. 2, Feb. 1997, pp. 200-208.

Sanger, "Neural Network Learning Control of Robot Manipulators Using Gradually Increasing Task Difficulty", IEEE Transactions on Robotics and Automation, vol. 10, No. 3, Jun. 1994, pp. 323-333.

Vukmirovic et al., "Neural Network workflow scheduling for large scale Utility Management Systems", 2010 IEEE International Conference on Systems Man and Cybernetics (SMC), Oct. 10-13, 2010, pp. 2307-2311.

* cited by examiner

HAPTIC-BASED ARTIFICIAL NEURAL NETWORK TRAINING

FIELD OF THE INVENTION

The present invention relates generally to the fields of haptic technology and artificial neural networks (ANN), and more particularly to the supervised training of ANNs using haptic technology.

BACKGROUND OF THE INVENTION

Haptic technology is a tactile feedback technology which takes advantage of the sense of touch by applying forces, vibrations, or motions to the user. Haptic feedback may be reproduced in a device through the use of electromagnetic technologies such as vibratory motors, capacitive actuation, or by other methods.

Artificial neural networks (ANNs) are computational models inspired by human central nervous systems that are capable of machine learning and pattern recognition. ANNs are usually presented as systems of interconnected "neurons" that can compute values from inputs by feeding information through the network. ANNs generally include sets of adaptive weights, i.e., numerical parameters that are tuned by a learning algorithm. The adaptive weights are, conceptually, connection strengths between "neurons," which are activated during training and prediction.

Once an ANN has been structured for a particular application, the network may be trained. To start the training process, initial weights are chosen via an educated guess of the user, or even randomly. In supervised training, both the inputs and the desired outputs are provided to the ANN. The ANN then processes the inputs and compares its results against the desired outputs. If the results do not agree, errors can be propagated back through the ANN, causing the ANN to adjust the weights. With increasing amounts of data (i.e., inputs and desired outputs), the ANN refines chosen weights. When the ANN has been adequately trained, the weights can be frozen, or the ANN can continue to learn and refine while in use.

SUMMARY

Aspects of an embodiment of the present invention disclose a method, computer program product, and computing system for training an artificial neural network based algorithm designed to monitor a first device. A processor receives a first data. A processor determines a first service action recommendation for a first device using the received first data and an artificial neural network (ANN) algorithm. A processor causes a second device to provide haptic feedback using the received first data. A processor receives a second service action recommendation for the first device based on the haptic feedback. A processor adjusts at least one parameter of the ANN algorithm such that the ANN algorithm determines a third service action recommendation for the first device using the received first data, wherein the third service action recommendation is equivalent to the second service action recommendation.

DETAILED DESCRIPTION

Figure 1:
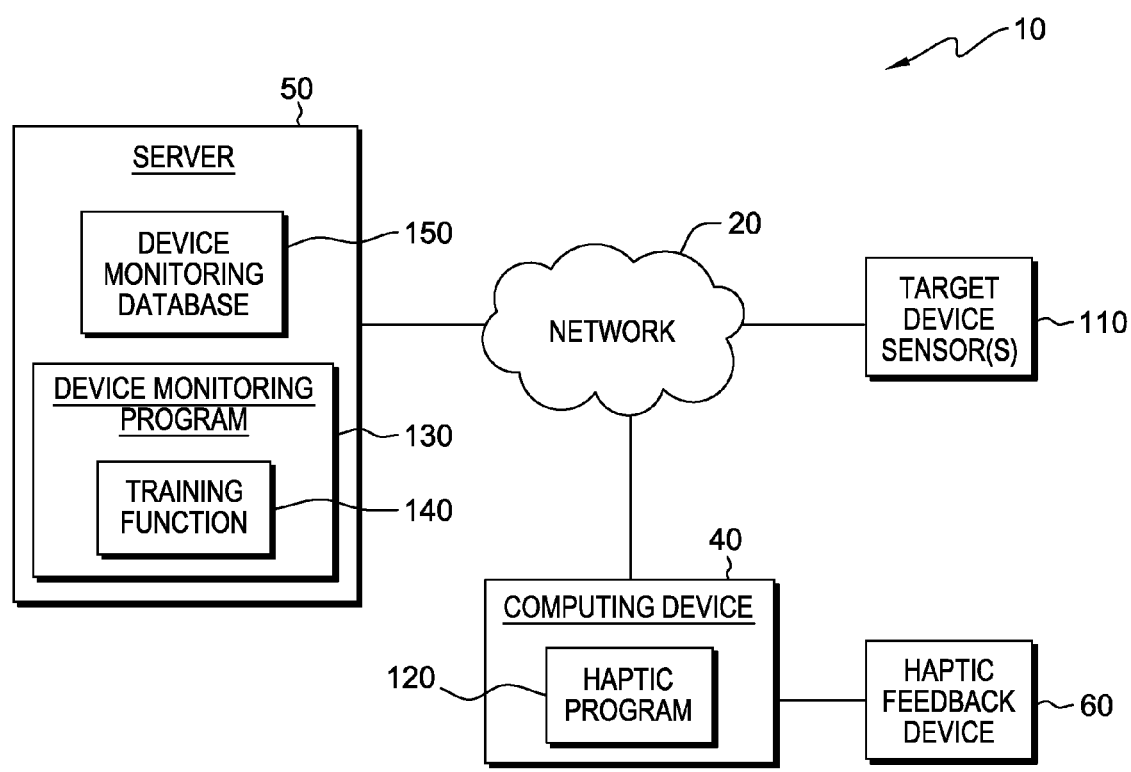
FIG. 1 depicts a diagram of a system in accordance with one embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java®, Smalltalk®, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

FIG. 1 depicts a diagram of system 10 in accordance with one embodiment of the present invention. FIG. 1 provides only an illustration of one embodiment and does not imply any limitations with regard to the environments in which different embodiments may be implemented.

In the depicted embodiment, system 10 includes computing device 40, server 50, and target device sensor(s) 110 interconnected over network 20. Network 20 may be a local area network (LAN), a wide area network (WAN) such as the Internet, any combination thereof, or any combination of connections and protocols that will support communications between server 50 and client computing device 40 in accordance with embodiments of the invention. Network 20 may include wired, wireless, or fiber optic connections. System 10 may include additional computing devices, servers, computers, or other devices not shown.

Target device sensor(s) 110 are one or more sensors operably affixed to a target device. The target device is any device or object that may experience vibrations during use or operation. For example, the target device may be a pump, fan, motor, generator, compressor, diesel engine, turbine, machine tool (e.g., a machine tool for cutting, boring, grinding, shearing or other forms of deformation), or other device. Target device sensor(s) 110 may include sensors that measure vibrations or motion, such as gyroscopes, accelerometers, or other sensors. Target device sensors 110 may include sensors that measure amplitude and frequency. In one embodiment, target device sensor(s) 110 includes one or more micro electro-mechanical systems (MEMS) accelerometers. Sensors that measure vibration and motion may be used as data by haptic program 120 to operate haptic feedback device 60. In some embodiments, additional sensors outside of the realm of motion and vibration may be included with target device sensor(s) 110. For example, sensors that measure temperature, flow rate, pressure, energy consumed, operating hours, or other types of information may additionally be included within target device sensor(s) 110. Target device sensor(s) 110 may be placed such that the entire target device, and/or individual components within or around the target device can be measured. In some embodiments, target device sensor(s) 110 may also include optic sensors and/or ultrasound sensors. In some embodiments, target device sensor(s) 110 may also include cameras, microphones, and/or other devices for transmitting audiovisual data.

In some embodiments, readings from target device sensor(s) 110 may be read by a computing device or controller (not shown) communicatively connected to target device sensor(s) 110. Such a computing device may enable the readings to be transmitted as data across network 20. For example, the computing device may transmit gathered sensor readings to computing device 40 or server 50 for use by haptic program 120, device monitoring program 130, and/or training function 140. In some embodiments, the computing device transmits gathered sensor readings to server 50 for storage to a file or database, such as device monitoring database 150.

Computing device 40 may be a management server, a web server, or any other electronic device or computing system capable of receiving and sending data. In some embodiments, computing device 40 may be a laptop computer, tablet computer, netbook computer, personal computer (PC), a desktop computer, a personal digital assistant (PDA), a smart phone, or any programmable electronic device capable of communicating with server 50 via network 20. Computing device 40 contains haptic program 120. In some embodiments, computing device 40 includes a haptic feedback device. In other embodiments, computing device 40 is communicatively connected to a haptic feedback device, such as haptic feedback device 60. Computing device 40 may include components, as depicted and described in further detail with respect to FIG. 4.

Haptic feedback device 60 is a device capable of providing tactile feedback and taking advantage of the sense of touch by applying forces, vibrations, or motions to the user. Haptic feedback device 60 is a device capable of reproducing vibrations of a target device, using data collected from one or more of target device sensor(s) 110. In some embodiments haptic feedback device 60 also can provide mechanical stimulation or otherwise generate physical properties that simulate the feel of a surface of a component of the target device. For example, haptic feedback device 60 may be able to utilize a series of motors to simulate that a surface is rough, or that defects exist on an otherwise smooth surface. In such an example, haptic feedback device 60 may utilize a display to provide a virtual image of the particular device under simulation, as well as the location that is being "felt." In some embodiments, haptic feedback device 60 is a display with both visual and haptic capabilities, such as vibration. In other embodiments, haptic feedback device 60 may be an object or surface containing one or more motors, capacitive actuators, or other devices capable of replicating a range of vibratory patterns. In some embodiments, haptic feedback device 60 may be a mobile device capable of replication a range of vibratory patters, such as a smart phone or tablet. In yet another embodiment, haptic feedback device 60 may be an object designed to replicate the look and feel of the target device. In such an embodiment, haptic feedback device 60 may contain motors, capacitive actuators, and/or other internal components that allow haptic feedback device 60 to replicate vibrations on specific surfaces of haptic feedback device 60 that corresponds to locations on the actual target device.

Haptic program 120 operates to cause a haptic feedback device, such as haptic feedback device 60, to operate based on received sensor data. In one embodiment, haptic program 120 receives sensor data from target device sensor(s) 110 via network 20. In another embodiment, device monitoring program 130 forwards sensor data to computing device 40 and haptic program 120 via network 20. In some embodiments, haptic program 120 also operates to receive action decision recommendations. For example, a user at computing device 40 may interact with a user interface of haptic program 120 to input an action decision recommendation. Such an action decision recommendation may be based on information the user obtained from viewing or touching haptic feedback device 60 or based on audio or visual information additionally presented. Action decision recommendations may include decisions related to the maintenance or monitoring of the target device. As previously mentioned, target device sensor(s) 110 may be operably affixed to the target device, and located such that meaningful information and data may be gathered. In some embodiments, action decision recommendations may include recommendations to service, repair, replace, take no action, or take a different action with regard to the target device and/or the various components that comprise the target device. In some embodiments, haptic program 120 also operates to forward received action decision recommendations to device monitoring program 130 and/or training function 140. In one embodiment, haptic program 120 resides on computing device 40. In other embodiments, haptic program 120 may reside on another server, another computing device, or server 50, provided that haptic program 120 is accessible to device monitoring program 130 and training function 140, and provided that haptic program 120 has access to device monitoring program 130, training function 140, and device monitoring database 150.

Server 50 may be a management server, a web server, or any other electronic device or computing system capable of receiving and sending data. In some embodiments, server 50 may be a laptop computer, tablet computer, netbook computer, personal computer (PC), a desktop computer, a personal digital assistant (PDA), a smart phone, or any programmable electronic device capable of communicating with computing device 40 and target device sensor(s) 110 via network 20. In other embodiments, server 50 may represent a server computing system utilizing multiple computers as a server system, such as in a cloud computing environment. Server 50 contains device monitoring program 130, training function 140, and device monitoring database 150. Server 50 may include components, as depicted and described in further detail with respect to FIG. 4.

Device monitoring program 130 operates to monitor a target device using target device sensor(s) 110, and to generate action decision recommendations with regards to the target device. In embodiments of the present invention, device monitoring program 130 uses an artificial neural network (ANN) based algorithm. In an ANN, each input (e.g., sensor readings, component information, hours of operation, etc.) is multiplied by a weight and then computed by a mathematical function which may determine the output of the algorithm. In the current embodiment, inputs may include sensory information related to vibration data, temperature sensors, component model information, or other information relevant to the wear and tear of the target device, depending on the particularities of the target device. For example, if the target device is a water pump, inputs may include data related to vibration, temperature, flow rate, pump pressure, water quality, energy consumed by the motor within the pump, pump efficiency, number of operating hours, age of the equipment, age of individual components, make and model of individual components, cost of the pump, cost of individual components, servicing costs, replacement costs, event logs, or other types of information. Weights may be positive and negative, and each weight may initially be decided based on an educated guess of a user, or by random selection. Training function 140 is a supervised learning process that can be used to train device monitoring program 130 based on given input information and desired output information. In one embodiment, device monitoring program 130 resides on server 50. In other embodiments, device monitoring program 130 may reside on another server, another computing device, or computing device 40, provided that device monitoring program 130 is accessible to haptic program 120 and training function 140 and provided that device monitoring program 130 has access to haptic program 120, training function 140, and device monitoring database 150.

Training function 140 operates to compare action decision recommendations received from haptic program 120 to action decision recommendations generated by device monitoring program 130. If training function 140 determines that the action decision recommendations are not in agreement (e.g., device monitoring program 130 provides an action decision recommendation that is not the same as the action decision recommendation received from haptic program 120), training function 140 adjusts the weights of decision monitoring program 140 based on available inputs to resolve the disagreement (e.g., the weights will be adjusted until the output action decision recommendation of device monitoring program 130 is the same as the action decision recommendation received from haptic program 120, when using the sensor data previously used). In some embodiments, training function 140 uses historical data that includes sensor readings and action decision recommendations associated with those sensor readings to fine-tune the weights of decision monitoring program 140 according to input data and desired results, such that decision monitoring program 140 can consistently generate action decision recommendations that are in agreement with action decision recommendations received from haptic program 120.

Various algorithms can be used which can adjust the weights of an ANN, such as decision monitoring program 140, in order to obtain the desired output, i.e., the action decision recommendation received from haptic program 120. Such algorithms may initially cause the generation of action decision recommendations that may be incorrect, but with additional data inputs and desired outputs, the weights may be incrementally adjusted such that the reliability of device monitoring program 130 increases. In some embodiments, once a threshold is reached, training function 140 may no longer be necessary. For example, device monitoring program 130 may generate action decision recommendations that are identical to action decision recommendations received from haptic program 120 for a specified period of time or above a certain percentage when compared to all received action decision recommendations. In other embodiments, each time the target device is repaired, replaced, or serviced, training function 140 will continue to run for a period of time. Running training function 140 after component repair, replacement, or servicing may allow training function 140 to adjust any weights that may require slight modifications due to changes in the target device as a result of the service performed.

Device monitoring database 150 may be a repository that may be written and read by device monitoring program 130 and training function 140. Device monitoring program weights, device monitoring program weight history, and other historical data, such as past sensor readings and associated decisions received from haptic program 120, may be stored to device monitoring database 150. In some embodiments, additional information may be stored to device monitoring database 150 such as component model information, operating hours, cost factors, local stock availability, and historical issue or event logs. In one embodiment, device monitoring database 150 resides on server 50. In other embodiments, device monitoring database 150 may reside on another server, another computing device, or computing device 40, provided that device monitoring database 150 is accessible to device monitoring program 130 and training function 140.

Figure 2:
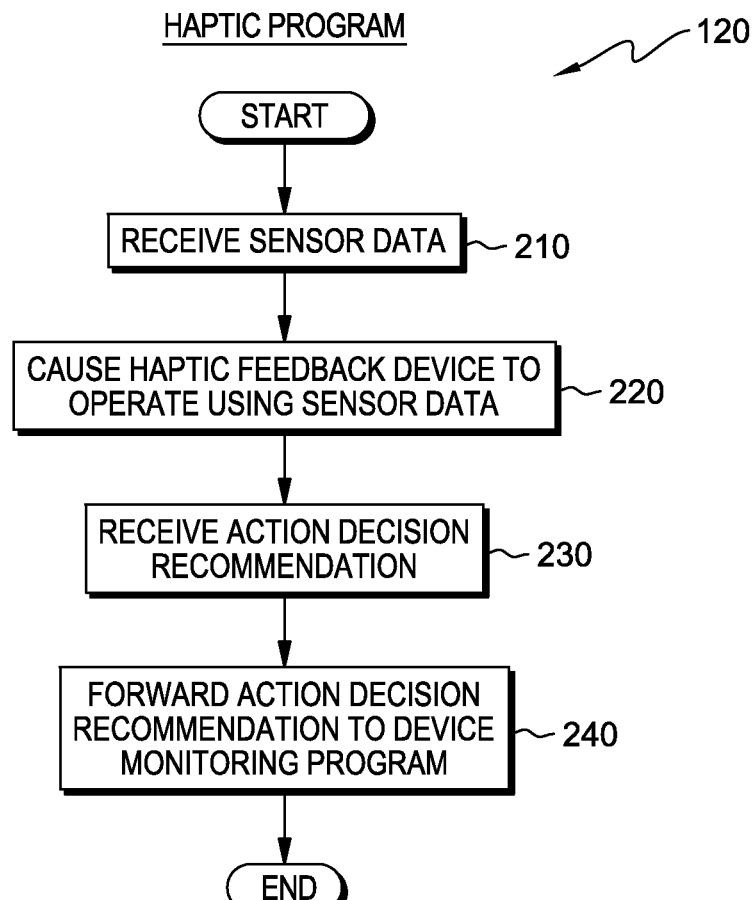
FIG. 2 depicts a flowchart of the steps of a haptic program executing within the system of FIG. 1, for causing a haptic feedback device to operate according to received sensor data, receiving action decision recommendations, and forwarding action decision recommendations to the device monitoring program, in accordance with one embodiment of the present invention.

FIG. 2 depicts a flowchart of the steps of haptic program 120 executing within the system of FIG. 1, in accordance with an embodiment of the present invention. Haptic program, 120 operates to receive data from target device sensor(s) 110 and use that data to cause the operation of haptic feedback device 60. Haptic program 120 also operates to receive an action decision recommendation and forward the recommendation to server 50 via network 20, for analysis by device monitoring program 130.

In one embodiment, initially, a target device is operably affixed with a variety of sensors, such as target device sensor(s) 110. Target device sensor(s) 110 include at least one sensor capable of gathering data related to motion and/or vibration. In some embodiments, target device sensor(s) 110 may include additional sensors that gather additional information. Target device sensor(s) 110 may additionally include cameras, microphones, or other devices capable of capturing and transmitting audio or video signals. The target device may be any device in which vibrations or moving parts may cause wear and tear, such that one of ordinary skill may be able to determine an action decision recommendation based on, in part, vibration. For example, the target device may be a water pump, fan, motor, or other device.

In step 210, haptic program 120 receives sensor data. Sensor data includes any data gathered by target device sensor(s) 110, and in some embodiments, specifically refers to data relevant to the generation of vibrations and movement by a haptic feedback device, such as haptic feedback device 60. In some embodiments, rather than sensor data, historical data, computer-generated data, or other data sources may be used. For example, a computer-generated model of the target device may be created and simulations may replicate the operation of the device, and simulate the creation of sensor data. In some embodiments, haptic program 120 may receive sensor data from a computing device (not shown) communicatively connected to target device sensor(s) 110, wherein the computing device monitors and stores data gathered from target device sensor(s) 110. In other embodiments, haptic program 120 accesses and retrieves sensor data from target device sensor(s) 110.

In step 220, haptic program 120 causes haptic feedback device 60 to operate using the sensor data received from target device sensor(s) 110. In one embodiment, haptic program 120 will control the motors, capacitive actuators, and/or other components of haptic feedback device 60 using sensor data from target device sensor(s) 110 to generate vibrations and/or movements that replicate the motions or vibrations being experienced by the target device or one or more components within the target device. In another embodiment, haptic program 120 will control the motors, capacitive actuators, and other components of haptic feedback device 60 using sensor data from target device sensor(s) 110 to provide mechanical or other stimulation to simulate the feel of the surface of a component or device. For example, optical sensors or other sensors may be used to detect roughness or cavities that have formed on the surface of a component, and haptic program 120 may use this sensor data to cause haptic feedback device 60 to provide mechanical stimulation or generate physical properties that simulate the feel of the surface of the component. In some embodiments, haptic program 120 may transfer the sensor data to another program designed to control a haptic feedback device, such as haptic feedback device 60. Haptic program 120 may cause haptic feedback device 60 to replicate vibration patterns and/or motions of individual components that make up the target device. For example, if the target device is a water pump, haptic program 120 may use different combinations of sensor data from target device sensor(s) 110 to cause haptic feedback device to replicate the vibrations on the motor, pump, casing, or subcomponents such as motor shaft or rotor. In some embodiments, a user at computing device 40 may be able to select individual components or devices via a user interface. In such an embodiment, once a component or system has been selected, haptic program 120 will cause haptic feedback device 60 to replicate vibrations or motions of the component or device based on sensor data applicable to the selected component or device.

In some embodiments, haptic program 120 may additionally cause audio, visual or other information to be displayed, based upon information available from target device sensor(s) 110. For example, target device sensor(s) 110 may include temperature sensors, and haptic program 120 may cause temperature information to be displayed on a display device. In another example, a camera or microphone may be included within target device sensor(s) 110, and haptic program may display a video on the display device and/or audio over one or more speakers.

In step 230, haptic program 120 receives an action decision recommendation. An action decision recommendation could be, for example, a decision to service, repair, replace, or take no action, with regards to a target device. The particulars of such an action decision recommendation are dependent upon the form of the target device (i.e., what type of device the target device is). Typically, the action decision recommendation received is from a user accessing haptic program 120 via computing device 40. For example, the action decision recommendation may be a decision made by a user at computing device 40, based on the vibration or movements generated by haptic feedback device 60. In some embodiments, haptic program 120 may prompt a user with a request for an action decision recommendation with a pop-up window or through another method. In other embodiments, a user at computing device 40 may initiate haptic program 120 or select an option within a user interface of haptic program 120 to input an action decision recommendation. In some embodiments, haptic program 120 will associate the received action decision recommendation with the sensor data received from target device sensor(s) 110. Haptic program 120 may associate a time range surrounding the received action decision recommendation, the associated sensor data at the time of the action decision recommendation, or another portion of the received sensor data.

In step 240, haptic program 120 forwards the received action decision recommendation to server 50 via network 20 for analysis by device monitoring program 130. In some embodiments, haptic program 120 will additionally forward the sensor data received from target device sensor(s) 110 that is associated with the received action decision recommendation. In some embodiments, the forwarded data may be stored to device monitoring database 150.

Figure 3:
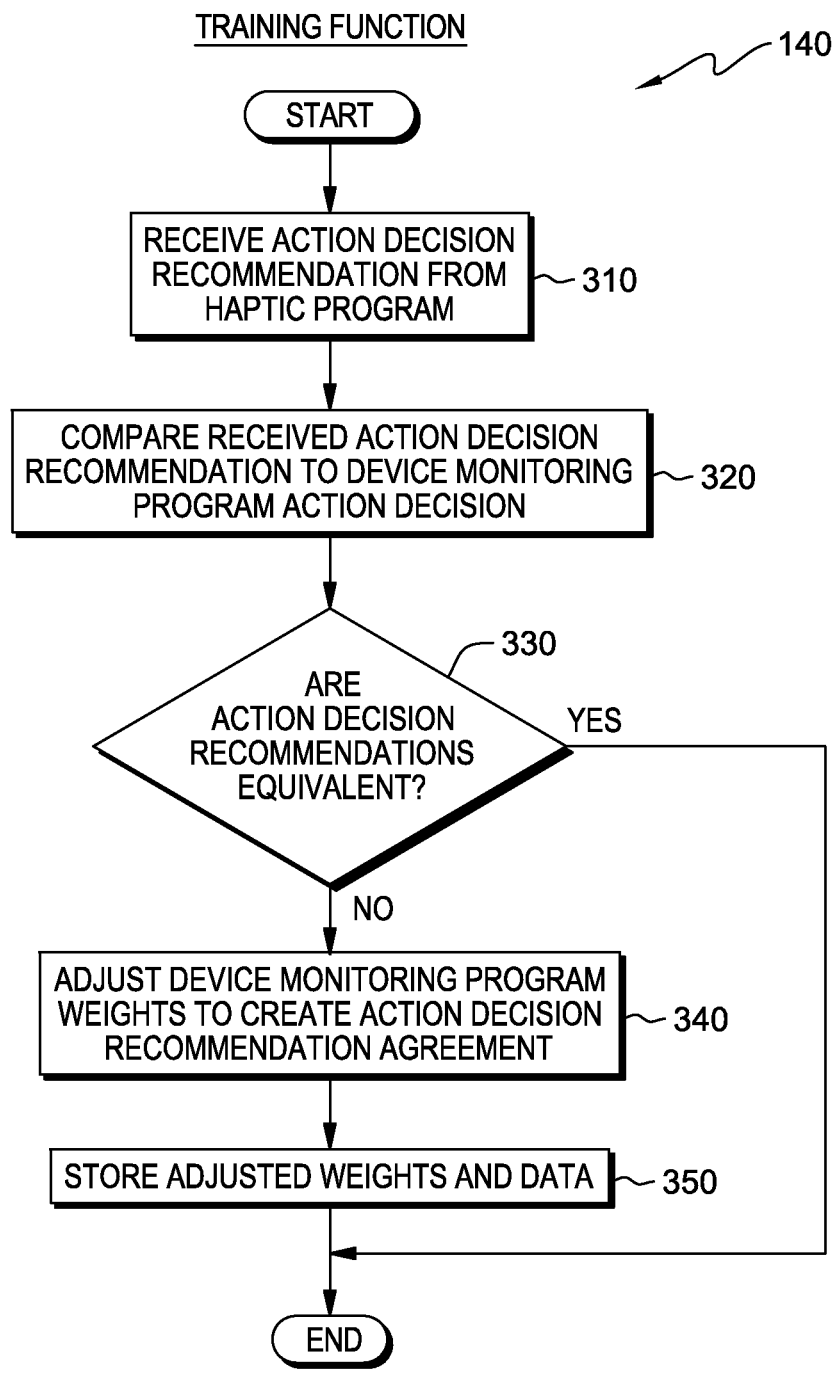
FIG. 3 depicts a flowchart of the steps of a training function executing within the system of FIG. 1, for comparing action decision recommendations and adjusting the device monitoring program weights to create action decision recommendation agreement, in accordance with one embodiment of the present invention.

FIG. 3 depicts a flowchart of the steps of training function 140, a function of device monitoring program 130, executing within the system of FIG. 1, in accordance with an embodiment of the present invention. Training function 140 operates to compare action decision recommendations received from haptic program 120 to action decision recommendations generated by device monitoring program 130.

In one embodiment, initially, haptic program 120 receives sensor data, causes a haptic feedback device to operate, and receives an action decision recommendation from a user at computing device 40. In some embodiments, the received action decision recommendation may be based on tactile interaction with the haptic feedback device. In some embodiments, audio, visual or other factors may have been considered by the user prior to submitting their action decision recommendation. After haptic program 120 receives the action decision recommendation, haptic program 120 forwards the action decision recommendation to device monitoring program 130 for analysis by training function 140.

In step 310, training function 140 receives an action decision recommendation from haptic program 120. In some embodiments, haptic program 120 may forward received action decision recommendations to training function 140. In other embodiments, training function 140 may monitor haptic program 120 and retrieve action decision recommendations from haptic program 120. In some embodiments, training function 140 may also receive the sensor data associated with the action decision recommendation, the time the action decision recommendation was made, a time period, or sets of data as collected prior to the receipt of the decision by haptic program 120.

In step 320, training function 140 compares the received action decision recommendation to a second action decision recommendation that has been generated by device monitoring program 130. Embodiments of device monitoring program 130 use artificial neural network (ANN) based algorithms to monitor the target device via target sensor(s) 110. Based on data collected from target sensor(s) 110, device monitoring program 130 generates action decision recommendations (e.g., repair, replace, take no action) for the target device or with regards to components that make up the target device. The ANN based algorithm of device monitoring program 130 includes inputs (e.g., received data such as sensor data, hours of operation, part information, etc.) that are multiplied by weights and calculated by one or more functions. Based on the results of the function(s), one or more action decision recommendations are generated. In some embodiments, device monitoring program 130 notifies training function 140 when an action decision recommendation has been generated by device monitoring program 130. In other embodiments, training function 140 monitors or accesses device monitoring program 130 or device monitoring database 150 to retrieve action decision recommendations generated by device monitoring program 130.

In decision 330, training function 140 determines if the action decision recommendation generated by device monitoring program 130 matches the action decision recommendation received by haptic program 120. Training function 140 may determine that the action decision recommendations match by examining the comparison between the action decision recommendation received from haptic program 120 and the action decision recommendation generated by device monitoring program 130 (see step 320). If the action decision recommendations match (e.g., each recommends replacing the same component, each recommends no service action), training function 140 may determine that the recommendations are equivalent (decision 330, yes branch). If the action decision recommendations are different (e.g., device monitoring program 130 generates a recommendation to service a component and the recommendation received from haptic program 120 is to take no action), training function 140 may determine that the recommendations are not equivalent (decision 330, no branch). If training function 140 determines that the action decision recommendation generated by device monitoring program 130 matches the action decision recommendation received by haptic program 120 (decision 330, yes branch), the function is complete.

If training function 140 determines that the action decision recommendation generated by device monitoring program 130 is different than the action decision recommendation received by haptic program 120 (decision 330, no branch), training function 140 may adjust device monitoring program 130 weights such that the action decision recommendation generated by device monitoring program 130 equals the action decision recommendation received from haptic program 120 (step 340). In some embodiments, training function 140 may adjust weights, parameters, and/or functions such that device monitoring program 130 will generate an action decision recommendation that is equal to the action decision recommendation received from haptic program 120. In some embodiments, training function 140 may consider additional factors, such as historical data stored to device monitoring database 150, such that alterations to the various weights, parameters, and/or functions used by device monitoring program 130 do not conflict with action decision recommendations previously received from haptic program 120. In some embodiments, a threshold or time frame may exist, such that training function 140 will only use historical data from device monitoring database 150 from specified time periods. In other embodiments, a threshold may dictate that training function 140 only use a particular number of historical datasets. In general, such a threshold may dictate the type of data to use, the time frame from which to use the data, or the amount of data to use.

In step 350, training function 140 stores the changes to weights, parameters, and/or functions to a database, such as device monitoring database 150. In some embodiments, training function 140 may additionally store the action decision recommendation received from haptic program 120 along with sensor data associated with the recommendation and possibly other relevant information (e.g., model number of components, time of operation, date of last service, etc.). Sensor data associated with an action decision recommendation may be the sensor data from the time the action decision recommendation was received, or sensor data from a specified period of time at or before when the action decision recommendation was received. In some embodiments, device monitoring program 130 may record sensor data with a timestamp, and in such an embodiment, training function 140 may store the timestamp associated with the action decision recommendation received from haptic program 120. Once the information is stored, the function is complete.

Information stored by training function 140 may be used by device monitoring program 130 to monitor the target device via target device sensor(s) 110 and generate future action decision recommendations. As historical data is received and stored, training function 140 may use the historical data to further refine the weights, parameters, and/or functions used by device monitoring program 130, such that device monitoring program 130 more frequently generates action decision recommendations equivalent to action decision recommendations received from haptic program 120. Eventually, device monitoring program 130 may operate with minimal adjustments from training function 140. In such a scenario, training function 140 may remain inactive until a service action is performed on the target device, or at various time periods for scheduled maintenance or testing.

Figure 4:
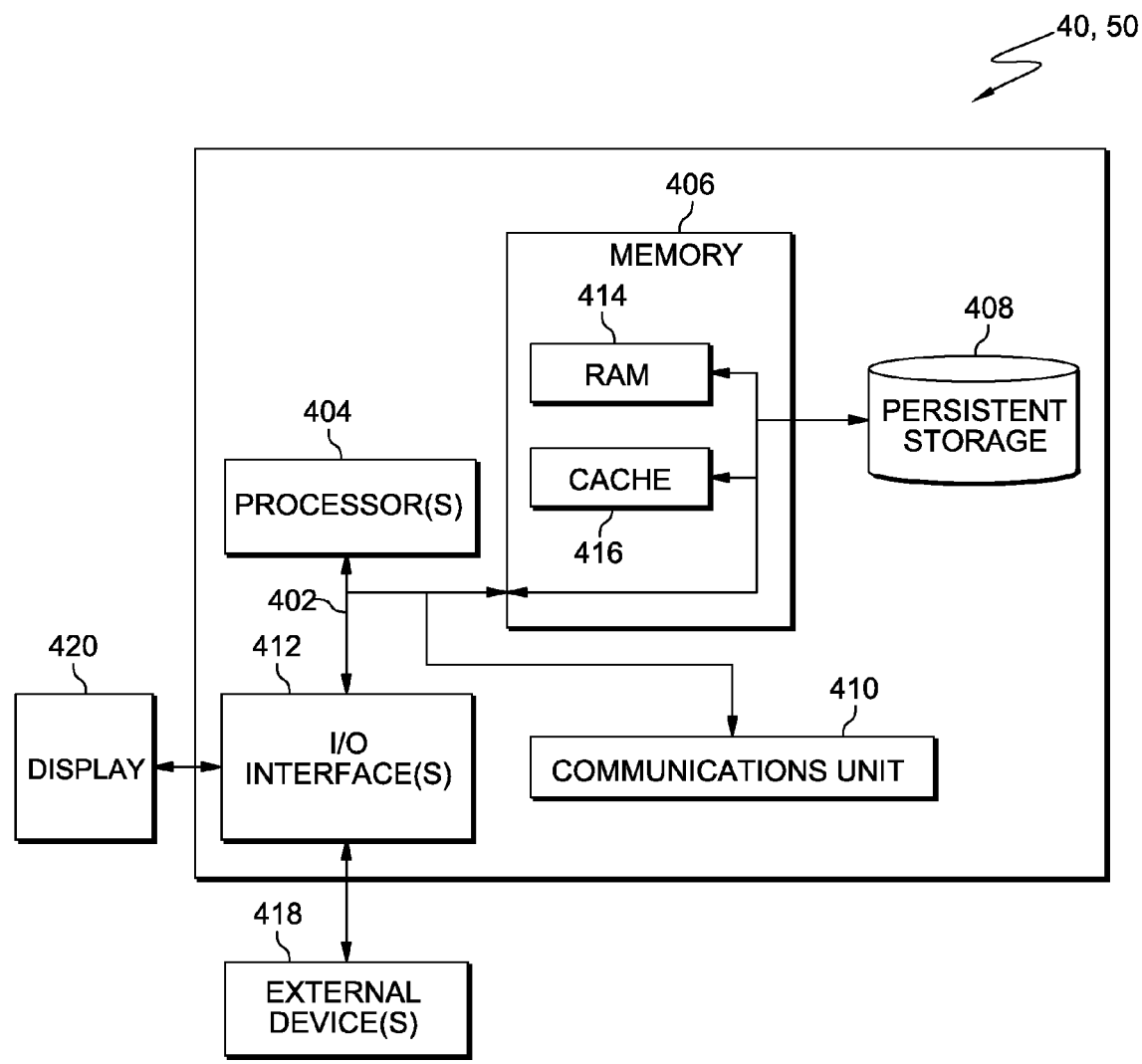
FIG. 4 depicts a block diagram of components of the server and the computing device in accordance with one embodiment of the present invention.

FIG. 4 depicts a block diagram of components of computing device 40 and server 50 in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Computing device 40 and server 50 each include communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 414 and cache memory 416. In general, memory 406 can include any suitable volatile or non-volatile computer-readable storage media.

Haptic program 120 is stored in persistent storage 408 of computing device 40 for execution by one or more of the respective computer processors 404 of computing device 40 via one or more memories of memory 406 of computing device 40. Device monitoring program 130, training function 140, and device monitoring database 150 are stored for execution and/or access by one or more of the respective computer processors 404 for server 50 via one or more memories of memory 406 of server 50. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other data processing systems or devices. In these examples, communications unit 410 includes one or more network interface cards. Communications unit 410 may provide communications through the use of either or both physical and wireless communications links. Haptic program 120 may be downloaded to persistent storage 408 of computing device 40 through communications unit 410 of computing device 40. Device monitoring program 130 and training function 140 may be downloaded to persistent storage 408 of server 50 through communications unit 410 of server 50.

I/O interface(s) 412 allows for input and output of data with other devices that may be connected to computing device 40 or server 50. For example, I/O interface 412 may provide a connection to external devices 418 such as a keyboard, keypad, a touch screen, and/or some other suitable input device. External devices 418 can also include portable computer-readable storage media such as, for example, thumb drives, portable optical or magnetic disks, and memory cards. Software and data used to practice embodiments of the present invention, e.g., haptic program 120, can be stored on such portable computer-readable storage media and can be loaded onto persistent storage 408 of computing device 40 via I/O interface(s) 412 of computing device 40. Software and data used to practice embodiments of the present invention, e.g., device monitoring program 130, training function 140, and device monitoring database 150, can be stored on such portable computer-readable storage media and can be loaded onto persistent storage of server 50 via I/O interface(s) 412 of server 50. I/O interface(s) 412 also connect to a display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer program product for training an artificial neural network based algorithm designed to monitor a first device, the computer program product comprising:
   one or more computer-readable storage media and program instructions stored on the one or more computer-readable storage devices, the program instructions comprising:
   program instructions to receiving a first data;
   program instructions to determine a first service action recommendation for a first device using the received first data and an artificial neural network (ANN) algorithm;

program instructions to cause a second device to provide haptic feedback using the received first data;

program instructions to receive a second service action recommendation for the first device based on the haptic feedback;

program instructions to determine that the second service action recommendation is different than the first service action recommendation; and program instructions to adjust at least one parameter of the ANN algorithm such that the ANN algorithm determines a third service action recommendation for the first device using the received first data, wherein the third service action recommendation is equivalent to the second service action recommendation.

2. The computer program product of claim 1, wherein program instructions to receive the first data comprises program instructions to receive the first data from one or more sensors operably affixed to the first device.

3. The computer program product of claim 2, wherein the one or more sensors collect amplitude and frequency data of vibrations of the first device.

4. The computer program product of claim 1, further comprising:

program instructions, stored on the one or more computer-readable storage devices, to receive a previously stored data and a previously stored service action recommendation for the first device associated with the previously stored data; and wherein program instructions to adjust the at least one parameter of the ANN algorithm such that the ANN algorithm determines the third service action recommendation for the first device using the received first data, wherein the third service action recommendation is equivalent to the second service action recommendation comprises:

program instructions, stored on the one or more computer-readable storage devices, to adjust the at least one parameter of the ANN algorithm such that the ANN algorithm determines a fourth service action recommendation for the first device using the previously stored data and the ANN algorithm determines the third service action recommendation for the first device using the received first data, wherein the third service action recommendation is equivalent to the second service action recommendation and wherein the fourth service action recommendation is equivalent to the previously stored service action recommendation.

5. The computer program product of claim 1, further comprising:

program instructions, stored on the one or more computer-readable storage devices, to receive a video feed from one or more video recording devices depicting at least a portion of the first device; and program instructions, stored on the one or more computer-readable storage devices, to cause the video feed to be displayed.

6. The computer program product of claim 5, wherein program instructions to receive a second service action recommendation for the first device based on the haptic feedback comprises:

program instructions to receive a second service action recommendation for the first device based on the haptic feedback and the video feed.

7. The computer program product of claim 1, wherein the haptic feedback includes generated physical properties to simulate how a surface of a component of the first device feels.

8. The computer program product of claim 1, wherein the at least one parameter includes a function and a weight.

9. A computer system for training an artificial neural network based algorithm designed to monitor a first device, the computer system comprising:

one or more computer processors, one or more computer-readable storage media, and program instructions stored on the computer-readable storage media for execution by at least one of the one or more processors, the program instructions comprising:

program instructions to receiving a first data;

program instructions to determine a first service action recommendation for a first device using the received first data and an artificial neural network (ANN) algorithm;

program instructions to cause a second device to provide haptic feedback using the received first data;

program instructions to receive a second service action recommendation for the first device based on the haptic feedback;

program instructions to determine that the second service action recommendation is different than the first service action recommendation; and program instructions to adjust at least one parameter of the ANN algorithm such that the ANN algorithm determines a third service action recommendation for the first device using the received first data, wherein the third service action recommendation is equivalent to the second service action recommendation.

10. The computer system of claim 9, wherein program instructions to receive the first data comprises program instructions to receive the first data from one or more sensors operably affixed to the first device.

11. The computer system of claim 10, wherein the one or more sensors collect amplitude and frequency data of vibrations of the first device.

12. The computer system of claim 9, further comprising:

program instructions, stored on the computer-readable storage media for execution by at least one of the one or more processors, to receive a previously stored data and a previously stored service action recommendation for the first device associated with the previously stored data; and wherein program instructions to adjust the at least one parameter of the ANN algorithm such that the ANN algorithm determines the third service action recommendation for the first device using the received first data, wherein the third service action recommendation is equivalent to the second service action recommendation comprises:

program instructions, stored on the computer-readable storage media for execution by at least one of the one or more processors, to adjust the at least one parameter of the ANN algorithm such that the ANN algorithm determines a fourth service action recommendation for the first device using the previously stored data and the ANN algorithm determines the third service action recommendation for the first device using the received first data, wherein the third service action recommendation is equivalent to the second service action recommendation and wherein the fourth service action recommendation is equivalent to the previously stored service action recommendation.

* * * * *